US012600347B2

(12) United States Patent
Neely et al.

(10) Patent No.: US 12,600,347 B2
(45) Date of Patent: Apr. 14, 2026

(54) VEHICLE ACCESSIBILITY PARKING

(71) Applicant: GM GLOBAL TECHNOLOGY OPERATIONS LLC, Detroit, MI (US)

(72) Inventors: Matthew Neely, Rochester, MI (US); Matthew E. Gilbert-Eyres, Rochester Hills, MI (US); Russell A. Patenaude, Macomb Township, MI (US); Eric T. Hosey, Rochester Hills, MI (US); Adam L. Wright, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 361 days.

(21) Appl. No.: 18/328,223

(22) Filed: Jun. 2, 2023

(65) Prior Publication Data

US 2024/0400038 A1 Dec. 5, 2024

(51) Int. Cl.
B60W 30/06 (2006.01)

(52) U.S. Cl.
CPC ......... B60W 30/06 (2013.01); *B60W 2754/20* (2020.02)

(58) Field of Classification Search
CPC . B60W 30/06; B60W 2754/20; B62D 15/027; B62D 15/0285; G05D 1/0212–0214; G08G 1/14; G08G 1/141; G08G 1/145; G08G 1/146
See application file for complete search history.

(56) References Cited

U.S. PATENT DOCUMENTS

| | | | | |
|---|---|---|---|---|
| 9,870,707 B2 * | 1/2018 | Korman | .................. | G08G 1/14 |
| 2017/0092130 A1 * | 3/2017 | Bostick | ................. | G08G 1/143 |
| 2020/0010051 A1 * | 1/2020 | Dumov | ................ | B60R 25/252 |
| 2020/0089973 A1 * | 3/2020 | Efland | ................ | G06K 9/00812 |
| 2020/0234582 A1 * | 7/2020 | Mintz | ................. | G08G 1/0968 |
| 2021/0101586 A1 * | 4/2021 | Woo | ........................ | B60W 30/06 |
| 2023/0008183 A1 * | 1/2023 | Fitzgerald | ........... | G05D 1/0061 |

FOREIGN PATENT DOCUMENTS

| | | | | | |
|---|---|---|---|---|---|
| DE | 102020208654 A | * | 1/2021 | ........... | H04W 52/00 |
| DE | 102015013318 B4 | * | 6/2021 | ........... | B60W 30/06 |
| WO | WO2020129516 A1 | * | 6/2020 | ........... | B60W 30/06 |

* cited by examiner

*Primary Examiner* — Jelani A Smith
(74) *Attorney, Agent, or Firm* — Quinn IP Law

(57) ABSTRACT

A system and method for vehicle accessibility parking including creating an accessibility profile associated with a vehicle and also creating a profile of the vehicle. Based on the profile of the vehicle and the accessibility profile, one or more parking locations are identified. The method includes a ranking, based on the profile of the vehicle and the accessibility profile, the identified one or more parking locations. The vehicle is then routed to a highest ranking identified one or more parking locations. Once routed, a sensor in the vehicle determines if a biasing of the vehicle in a parking space in the highest ranking identified one or more parking locations is required. Based on the biasing, an adjusting of a target parking position for the vehicle in the parking space is performed.

20 Claims, 4 Drawing Sheets

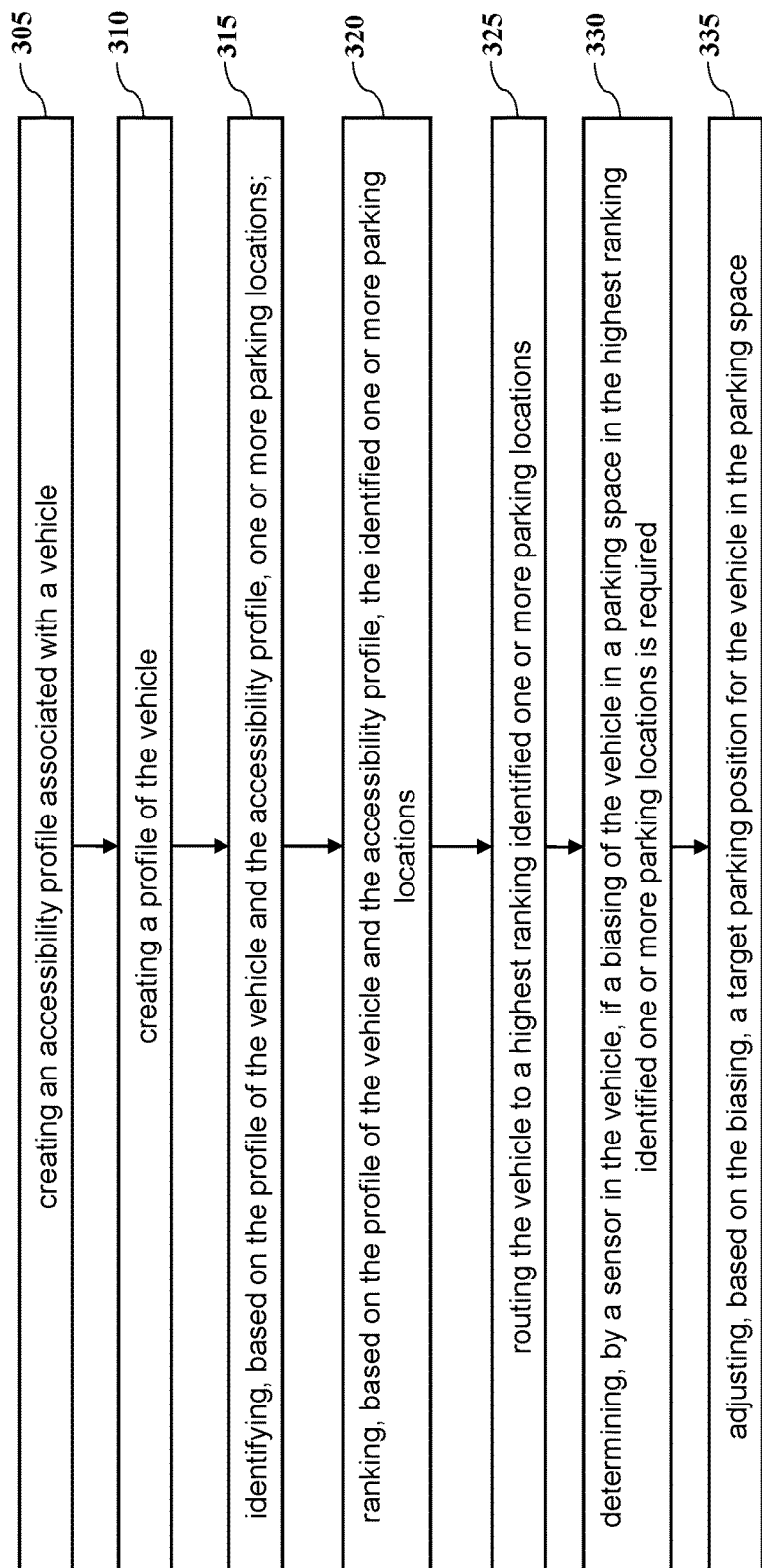

300

305 — creating an accessibility profile associated with a vehicle

310 — creating a profile of the vehicle

315 — identifying, based on the profile of the vehicle and the accessibility profile, one or more parking locations;

320 — ranking, based on the profile of the vehicle and the accessibility profile, the identified one or more parking locations 325 — routing the vehicle to a highest ranking identified one or more parking locations 330 — determining, by a sensor in the vehicle, if a biasing of the vehicle in a parking space in the highest ranking identified one or more parking locations is required 335 — adjusting, based on the biasing, a target parking position for the vehicle in the parking space

FIG. 3

VEHICLE ACCESSIBILITY PARKING

INTRODUCTION

Vehicles are a staple of everyday life. Special use cameras, microcontrollers, laser technologies, and sensors may be used in many different applications in a vehicle. Cameras, microcontrollers, and sensors may be utilized in enhancing automated structures that offer state-of-the-art experience and services to the customers, for example in tasks such as automated parking, parking assist, body control, camera vision, information display, security, autonomous controls, etc. Further, functions utilizing proximity assistance may be used in situations where a vehicle or its occupants may need assistance in parking, entering, and exiting a vehicle.

The parking of a vehicle may present a number of challenges. A driver may pull a vehicle too close to a wall or a neighboring vehicle to fully open the door without contacting an obstacle, e.g., the wall or another vehicle. Further, if the vehicle is equipped with mobility assistance options, for example a ramp, additional space may be required on the side or rear of the vehicle when parked in order to enter or exit the vehicle. In other examples, even without the use of mobility assistance options, a passenger may require additional space to enter or exit the vehicle when parked. Accordingly, it is desirable to automatically guide and park the vehicle in such a manner as to provide additional space for a vehicle occupant to enter and exit the vehicle.

SUMMARY

Disclosed herein are a system and methods for vehicle accessibility parking based on a vehicle profile and vehicle sensor data. As disclosed herein, a method for vehicle accessibility parking may include creating an accessibility profile associated with a vehicle that may include creating a profile of the vehicle. The method may also include identifying, based on the profile of the vehicle and the accessibility profile, one or more parking locations. The method may then perform a ranking, based on the profile of the vehicle and the accessibility profile, of the identified one or more parking locations. The method may then perform a routing of the vehicle to a highest ranking identified one or more parking locations and then may also determine, by a sensor in the vehicle, if a biasing of the vehicle in a parking space in the highest ranking identified one or more parking locations is required. The method may then perform an adjusting, based on the biasing, a target parking position for the vehicle in the parking space.

Another aspect of the method may include determining that an adjacent vehicle is blocking the parking space based on the accessibility profile.

Another aspect of the method may include generating a request to move the adjacent vehicle that is blocking the parking space based on the accessibility profile.

Another aspect of the method may include where the adjusting of the target parking position is performed by the vehicle autonomously.

Another aspect of the method may include where the adjusting of the target parking position is performed by the vehicle autonomously based on one or more vehicle sensors.

Another aspect of the method may include where one or more vehicle sensors includes one or more of a global positioning sensor, an ultrawide band sensor, a vehicle-to-vehicle communication, a cellular communication, and a short range/near field protocol.

Another aspect of the method may include where after routing the vehicle to the highest ranking identified one or more parking locations, when the highest ranking identified one or more parking locations is not available, the vehicle autonomously proceeds to a predefined location.

Another aspect of the method may include identifying the one or more parking locations utilizing crowd sourcing.

Another aspect of the method may include identifying the one or more parking locations utilizing a third-party data source.

Another aspect of the method may include where the accessibility profile includes a known parking location, vehicle access equipment, and a maximum distance to a point of interest.

Another aspect of the method may include where the profile of the vehicle includes a requirement for vehicle access equipment.

Another aspect of the method may include where the requirement for the vehicle access equipment includes a location on the vehicle and a clearance space required for the vehicle access equipment.

Another aspect of the method may include where the biasing further includes determining an offset within the parking space for the vehicle based on an access requirement of the vehicle.

Another aspect of the method may include where if the highest ranking identified one or more parking locations is located more than a threshold distance from a point of interest then a route to a next best known parking location is determined.

As disclosed herein, a system for vehicle accessibility parking may include a vehicle equipped with one or more sensors configured to capture parking space information within one or more parking locations. The system may also include a database, configured to collect and store a vehicle profile, and an accessibility profile associated with the vehicle, where based on the vehicle profile and the accessibility profile, the one or more parking locations may be identified. Further, the system may be based on the vehicle profile and the accessibility profile, perform a ranking of the identified one or more parking locations, and based on the ranking, perform a routing of the vehicle to a highest ranking identified one or more parking locations. The system may include, based on the one or more sensors for capturing the parking space information, determining if a biasing of the vehicle in a parking space in the highest ranking identified one or more parking locations is required. The system may then, based on the biasing, adjust a target parking position for the vehicle in the parking space.

Another aspect of the disclosure may be a system where the one or more sensors may include a sensing camera.

Another aspect of the disclosure may be a system where the one or more sensors may include one or more of a global positioning sensor, an ultrawide band sensor, a vehicle-to-vehicle communication, a cellular communication, and a short range/near field protocol.

Another aspect of the disclosure may be a system where, based on the one or more sensors, determining that an adjacent vehicle is blocking the parking space based on the accessibility profile.

Another aspect of the disclosure may be a system that may include a communication device within the vehicle designed to generate a request to move the adjacent vehicle.

Another aspect of the disclosure may include a method for vehicle accessibility parking that includes creating an accessibility profile associated with a vehicle and creating a profile of the vehicle. The method may also include identifying, based on the profile of the vehicle and the accessibility profile, one or more parking locations. The method may include a ranking, based on the profile of the vehicle and the accessibility profile, the identified one or more parking locations, including a routing of the vehicle to a highest ranking identified one or more parking locations. Further, the method may include determining, by a sensor in the vehicle, if a biasing of the vehicle in a parking space in the highest ranking identified one or more parking locations is required. The method may include determining that an adjacent second vehicle is blocking the parking space based on the accessibility profile, and then generating, based on the adjacent second vehicle blocking the parking space, a request to move the adjacent second vehicle. The method may then include adjusting, autonomously and automatically, based on the biasing, using one or more vehicle sensors, a target parking position for the vehicle in the parking space.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 3 depicts a flowchart of a method for vehicle accessibility parking, in accordance with the disclosure.

Figure 1B:
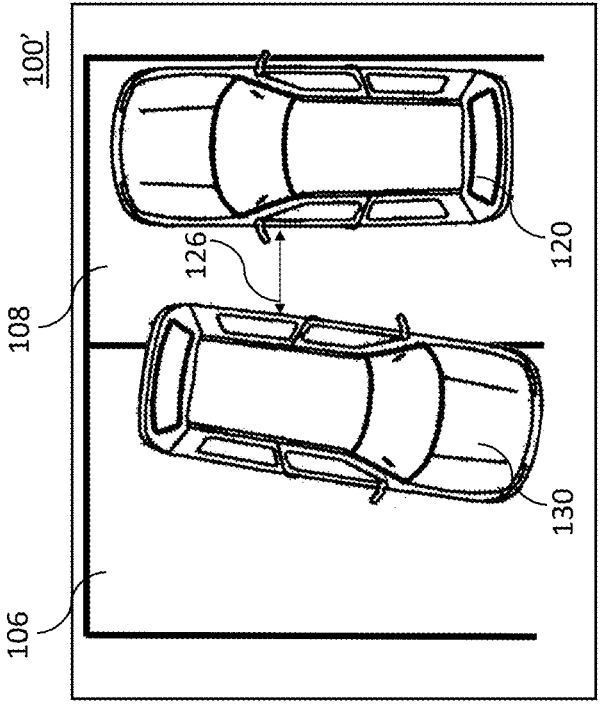
FIGS. 1A and 1B are illustrations of parking scenarios, in accordance with the disclosure.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiments in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Referring to the drawings, the left most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110a" and "110b" may indicate two different input devices which may be functionally the same, but may be located at different points in a simulation arena).

Vehicles have become computationally advanced and equipped with multiple microcontrollers, sensors, processors, and control systems, including for example, autonomous vehicle and advanced driver assistance systems (AV/ADAS) such as adaptive cruise control, automated parking, automatic brake hold, automatic braking, evasive steering assist, lane keeping assist, adaptive headlights, backup assist, blind spot detection, cross traffic alert, local hazard alert, and rear automatic braking may depend on information obtained from cameras and sensors on a vehicle. Such systems may also provide a wealth of information about the vehicle, including, for example, location, automatic assistance sensors, occupancy data, motion sensors, to name a few. These systems may also provide detailed data as to the operation and location of a vehicle. Such information may be combined with remote databases, for example a cloud-based operation, to share data with other vehicles to augment parking data and/or provide access from third party providers.

Figure 1A:
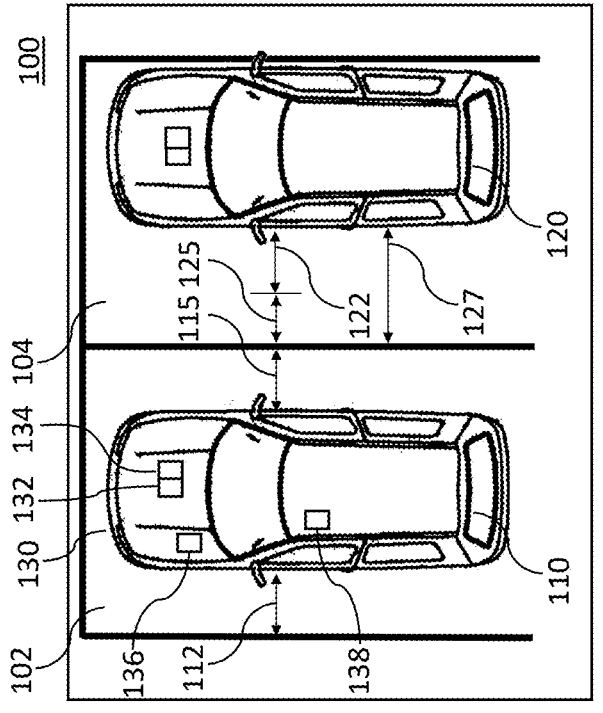

FIG. 1A is an illustration of a parking scenario 100, according to an embodiment of the present disclosure. Such parking may be located in multiple environments, for example in a parking garage or a surface lot. Also possible, but not shown, is a parallel parking arrangement. In addition, as shown is a parking scenario for two vehicles, but this is just an example and not meant to be limiting.

Parking scenario 100 shows vehicle 110 parked in space 102 and vehicle 120 parked in space 104 in a side-by-side layout. Vehicle 110 is parked essentially in the middle of space 102 with a left side clearance 112 and a right side clearance 115. In a "perfect" parking situation the left side clearance 112 amount is substantially equivalent to the right side clearance 115, e.g., parked in the middle of the space. Vehicle 110 further comprises a sensor 130, a processor 132, a database 134 associated with processor 132, a communications device 136, and a control system 138.

Vehicle 120 is shown purposely parked flush to the right hand side of space 104, increasing the clearance space on the left side of vehicle 120, which is shown as clearance 127, the clearance between the left side of vehicle 120 and the left edge of space 104. Thus, the clearance between vehicle 110 and vehicle 120 is the sum of clearance 127 and clearance 115.

Further, the clearance 127 may be shown as including clearance 122 and clearance 125, where clearance 122 is an amount of side clearance from the vehicle to the edge of a parking space when the vehicle is parked in the middle of the space. Clearance 125 may be referred to as an additional offset or bias amount that may be gained by parking the vehicle off-center. The additional offset of bias distance may increase the amount of available space for entering and exiting the vehicle. For example, if an occupant requires extra space due to the use of an accessibility option, device, ramp, or other type of vehicle access equipment. Such an additional offset of bias distance may be desired on the right or left side of the vehicle, or from the front or rear. Such configuration requirements may be stored in an accessibility profile associated with the vehicle and with one or more particular occupants. Further, as will be discussed, a particular parking space may be detected and determined to be acceptable through the use of vehicle sensors, e.g., sensing camera, light detection and ranging (LIDAR), radar, etc.

FIG. 1B is an illustration of a parking scenario 100', according to an embodiment of the present disclosure. Parking scenario 100' shows vehicle 130 attempting to be parked in space 106, but in reality is blocking a portion of the space 108, which depending upon the additional offset or bias distance needed, space 108 may not be suitable for parking vehicle 120. For example, the distance between the driver's door on vehicle 120 is a clearance 126 that may be less clearance than needed for the driver of vehicle 120 to enter or exit.

Figure 2A:
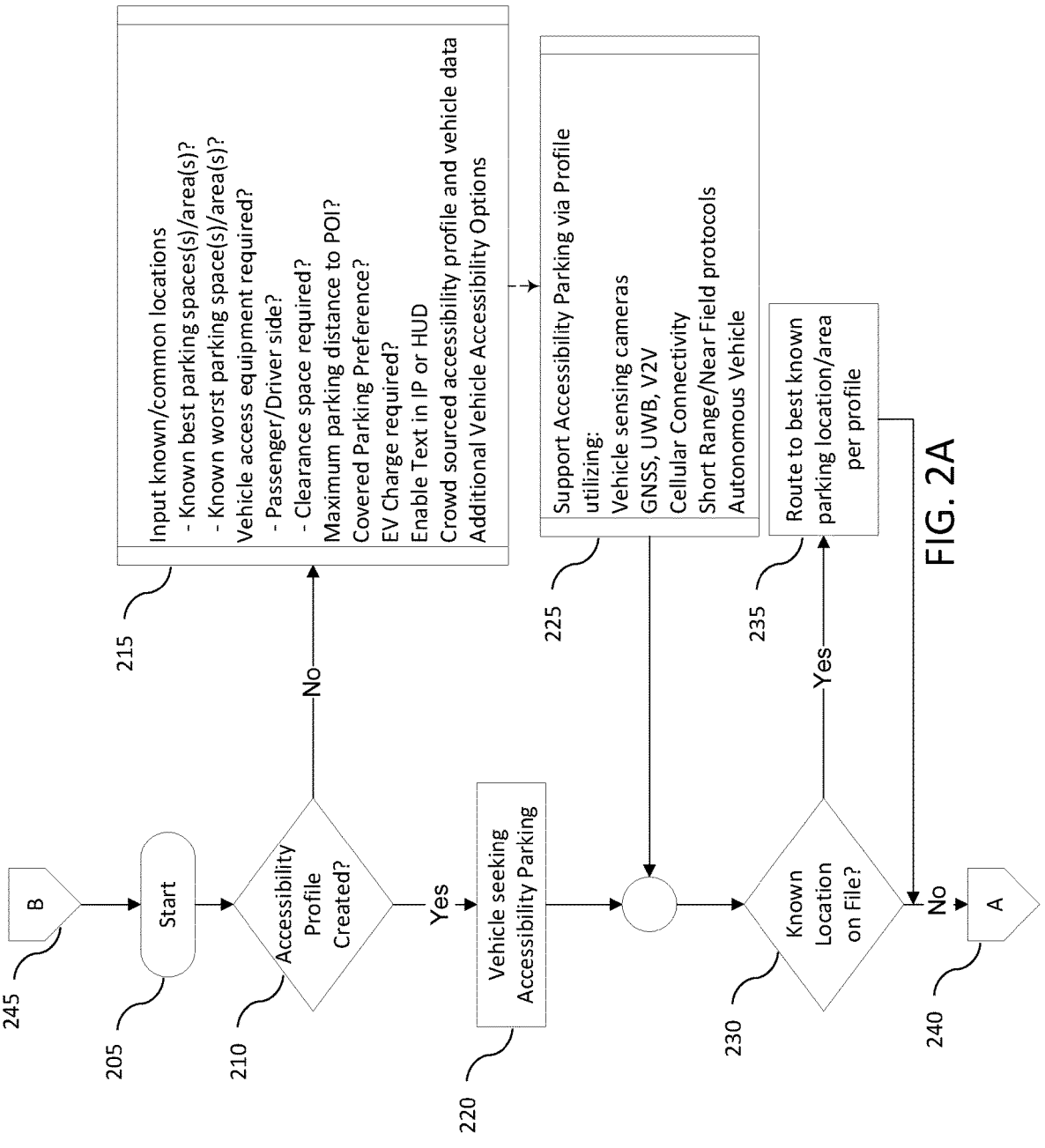
FIGS. 2A and 2B illustrate a flowchart for a vehicle seeking accessibility parking, in accordance with the disclosure.
Figure 2B:
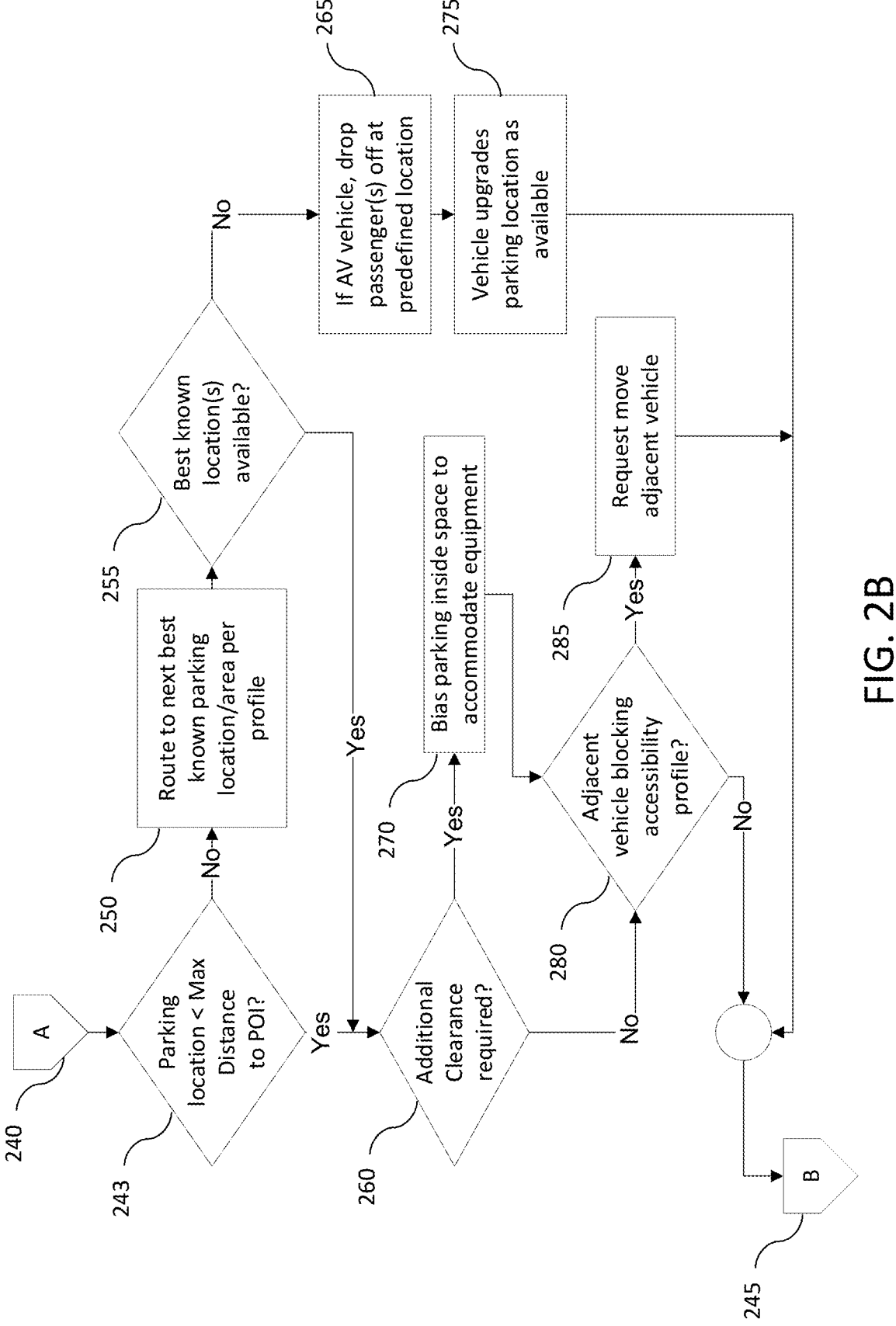

FIGS. 2A and 2B illustrate a flowchart for a vehicle seeking accessibility parking, according to an embodiment of the present disclosure. The flowchart starts at step 205 and proceeds to step 210 where it may be determined whether an accessibility profile currently exists or if one needs to be created. An accessibility profile may be associated with a particular vehicle and/or person. Further, the vehicle may also be defined by a vehicle profile where the profile of the vehicle may contain specific information about the vehicle. For example, a vehicle's make, style, model, dimensions, and other pertinent information.

In addition, a vehicle and its profile may be associated with multiple accessibility profiles covering multiple individual occupants. The accessibility profile may be developed, customized, and managed by a mobile application or a web-based application. The accessibility profile may also be stored on a mobile device, in the cloud, or a remote server and may also be communicated to one or more vehicles. The accessibility profile may also be referred to within this disclosure as containing the vehicle profile information.

If the accessibility profile does not exist, then at step 215 the accessibility profile may be created and include criteria such as known or common parking locations that may include a listing of known best parking spaces or areas and may also contain a listing of known worst parking spaces or locations. The profile may also include information pertaining to the vehicle such as the inclusion of vehicle access equipment included in the vehicle in addition to information such as the location of the vehicle access equipment, for example on the passenger side or the driver side of the vehicle. Or, in some instances the vehicle access equipment may be located in the front or rear of the vehicle. In addition, data concerning the vehicle access equipment may include the amount of clearance space required to operate the vehicle access equipment.

The accessibility profile may also include information such as a maximum parking distance to one or more points of interest, for example the parking space needs to be within one block of a museum. The accessibility profile may also include information such as a preference for covered parking or the need for an electric vehicle charging station. In addition, the accessibility profile may specify that information to an occupant is displayed in a heads up display or through the use of real-time texting. Further, the accessibility profile may include crowd sourced information and vehicle data as well as other vehicle accessibility options, for example, the type of vehicle and other operational controls.

When an accessibility profile has been created, or was previously created, at step 220 the vehicle may begin the process of seeking accessibility parking. Seeking accessibility parking may also include the support of devices within the vehicle, for example as shown in step 225. Step 225 may include the use of vehicle sensing cameras that may scan a parking space to determine its size and accessibility. Other devices such as global positioning or global navigation satellite systems, ultra-wide-band, and vehicle-to-vehicle may also be used to find, route, or analyze possible accessibility parking. In addition, cellular systems, and short range and near field protocols may also be involved. In addition, in some embodiments, the use of an autonomous vehicle may also be employed.

At step 230, in the process of seeking accessibility parking, the process may include determining if one or more known parking locations or parking areas exist, for example, from previous searches, or possibly from crowd sourced or third-party applications. If a known parking space or parking location is known that satisfies the accessibility profile, then at step 235 a route to the best of the known locations may be calculated or generated. If there is no known location on file, then at step 240 the process continues to FIG. 2B. The flowchart then continues at step 243 where a determination may be made whether a possible parking location is less than a predefined distance to a point of interest.

If the determination is made that a potential parking location is greater than a maximum predefined distance from a point of interest, e.g., a destination, then at step 250 a route to a next best known parking location or space may be determined where such a space or area may be compliant with the accessibility profile. If, at step 255, the best known or the next best parking location is not available, then if the vehicle is an autonomous vehicle, at step 265 one or more of the passengers may be dropped off at a predefined location and the autonomous vehicle may proceed to an available parking space. In addition, at step 275, if an upgraded parking location becomes available, e.g., a parking space closer to the point of interest or one that better matches the accessibility profile, then the vehicle may autonomously proceed to that space.

If, back at step 255, the best known or the next best parking location is available, then the vehicle may proceed to the best available known parking location. The best available known parking location may be the first choice location or whichever best ranked location is available. At step 260 the vehicle may determine, once it has arrived at the available parking location, if the space actually meets the accessibility profile. Such a determination may be made using an onboard sensor in the vehicle, for example a sensing camera, LIDAR, radar, or other sensors. Further, at step 260, a determination may be made if additional clearance may be required, for example by parking off-center within the parking space. If additional clearance is required, then at step 270, the vehicle sensors may be used to determine an amount of bias, or offset, is needed as specified in the accessibility profile. For example, if the vehicle includes access equipment that requires additional space.

At step 280 a further determination may be made if an adjacent vehicle is blocking the desired parking space, for example, as shown in FIG. 1B with vehicle 130 partially blocking space 108 that may be in violation of the accessibility profile. If the adjacent vehicle is blocking the parking space based on the accessibility profile, then at step 285 a request may be generated to move the adjacent vehicle. Such a request may be generated in a vehicle-to-vehicle type communication, to a fleet operator if applicable, or a manufacturer, or controlling entity. In an embodiment, the request may result in the adjacent vehicle autonomously moving to accommodate the accessibility profile. The flowchart then returns to step 245 to start the process again.

FIG. 3 shows an exemplary embodiment of a method 300 for vehicle accessibility parking, according to an embodiment of the present disclosure. Method 300 begins at step 305 by creating an accessibility profile associated with a vehicle. The accessibility profile may contain information regarding known parking locations, parking spaces, and common parking areas. Such information may be obtained through crowd sourcing, third-party applications, or databases, or from previous traveling or personal knowledge. The accessibility profile may also contain information regarding access equipment within the vehicle or in use by one of more passengers. For example, a vehicle may be equipped with an extension ramp or lift. The profile may also specify where additional clearance space is needed, for example, on the driver's side, the rear of the vehicle, or on the passenger side of the vehicle. Further, the profile may also specify a maximum distance from a particular point of interest to the parking space. The profile may also specify particular places to park in relation to the point of interest, for example, by the side door of a building or the closest location with access to an elevator.

Step 310 may include the creation of a profile of the vehicle. As discussed in FIG. 2A, the accessibility profile may contain information about a particular vehicle, e.g., a profile of the vehicle. For example, the profile of the vehicle may include the type of vehicle, the style of the vehicle, the dimensions of the vehicle, and details of access equipment installed or configured in the vehicle.

At step 315, one or more parking locations may be identified based on the profile of the vehicle and the accessibility profile. As discussed with FIGS. 2A and 2B, a vehicle may be associated with multiple occupants, each with their own accessibility requirements and thus the accessibility profile associated with a first person in the vehicle may be different with an accessibility profile associated with a second person in the vehicle. Thus, in step 315 identifying one or more parking locations may be dependent on both an accessibility profile and a profile of the vehicle.

At step 320 the identified one or more parking locations may be ranked based on both the profile of the vehicle and the accessibility profile. For example, as discussed in FIG. 2A, the accessibility profile may include information about the best known parking areas and also the known worst parking areas. The best and worst parking areas may also be influenced by the profile of the vehicle. For example, if the vehicle is a recreational vehicle or a two-door compact car, the parking options for each may be vastly different.

At step 325 a routing of the vehicle to the highest ranking identified one or more parking locations is performed. At step 330, after the vehicle is routed to the highest ranking identified one or more parking locations, the vehicle determines if a biasing of the vehicle in a parking space is required. As discussed in FIG. 2B, a vehicle may use one or more of its sensors, for example a sensing camera that may examine a target parking space to see if a biasing, or an offsetting to one side or other, of the vehicle to accommodate accessibility such as with the use of access equipment. The biasing may also apply to biasing in the front or rear of the vehicle to accommodate accessibility or access equipment.

At step 335, the target parking position may be adjusted based on the biasing for the vehicle in the parking space. As discussed and shown in FIG. 1A with vehicle 120 in space 104, the vehicle is parked to the far right of the space. Vehicle 120 may determine that an additional offset or bias amount is shown as clearance 125. Clearance 125 is the additional space gained by adjusting the target parking position to the right resulting in a total clearance 122 for more accessible entering and exiting of the vehicle 120.

The method may also include detecting and determining that an adjacent vehicle is blocking the parking space based on the accessibility profile. Based on the blocking a request to move the adjacent vehicle may be generated. In some embodiments, the adjacent vehicle may automatically and autonomously re-park the vehicle such that it is no longer blocking the parking space.

Method 300 may then end.

The description and abstract sections may set forth one or more embodiments of the present disclosure as contemplated by the inventor(s), and thus, are not intended to limit the present disclosure and the appended claims.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A method for vehicle accessibility parking, comprising:

creating an accessibility profile associated with a vehicle;

developing, customizing, and managing the accessibility profile with a mobile application or a web-based application;

creating a vehicle profile associated with the vehicle;

wherein the vehicle profile comprises information about a required clearance distance for a wheelchair extension ramp and/or a wheelchair lift that extends outwards from a side or a rear position of the vehicle;

identifying, based on the vehicle profile and the accessibility profile, one or more parking locations;

ranking, based on the vehicle profile and the accessibility profile, the one or more parking locations and selecting a highest ranking parking location;

routing the vehicle to the highest ranking parking location;

determining, by using one or more vehicle sensors, if a biasing of the vehicle in the highest ranking parking location is required;

autonomously adjusting, by the vehicle using the one or more vehicle sensors, based on the biasing, a target parking position for the vehicle in the highest ranking parking location;

determining that an adjacent vehicle is blocking the highest ranking parking location based on the accessibility profile;

generating a request to move the adjacent vehicle to a different location;

sending the request (a) in a vehicle-to-vehicle communication, (b) to a fleet operator, (c) to a manufacturer, or (d) to a controlling entity;

wherein the one or more vehicle sensors comprise one or more of a global positioning sensor, an ultrawide band sensor, a vehicle-to-vehicle communication, a cellular communication, and a short range/near field protocol; and after routing the vehicle to the highest ranking parking location, if the highest ranking parking location is not available, then dropping one or more passengers off at a predefined location via the vehicle, and then proceeding autonomously to a next available parking space.

2. The method of claim 1, further comprising identifying the highest ranking parking location by utilizing crowd sourcing.

3. The method of claim 1, further comprising identifying the highest ranking parking location by utilizing a third-party data source.

4. The method of claim 1, wherein the accessibility profile comprises information about: (a) a known parking location, (b) vehicle access equipment, and/or (c) a maximum distance to a point of interest; and wherein the vehicle profile is associated with at least two different accessibility profiles assigned to at least two occupants of the vehicle.

5. The method of claim 1, wherein the accessibility profile comprises a clearance distance required for vehicle access equipment.

6. The method of claim 1, wherein the biasing further comprises determining an offset distance within the parking location for the vehicle based on an access requirement of the vehicle.

7. The method of claim 1, further comprising determining a route to a next best known parking location if the highest ranking parking location is located more than a threshold distance from a point of interest.

8. A system for vehicle accessibility parking comprising:

a vehicle equipped with one or more sensors configured to capture parking space information associated with one or more parking locations;

a processor, coupled to a database configured to collect and store a vehicle profile and an accessibility profile associated with the vehicle, wherein, based on the vehicle profile and the accessibility profile, the processor is further configured to identify the one or more parking locations;

a control system; and wherein the accessibility profile is developed, customized, and managed with a mobile application or a web-based application; and wherein the processor is further configured to determine a highest ranking parking location of the vehicle, based on the vehicle profile and the accessibility profile, and based on a ranking of the one or more parking locations;

wherein the control system is configured to route the vehicle to the highest ranking parking location, based on the ranking;

wherein the processor is further configured to determine, based on the one or more sensors, if a biasing of the vehicle in the highest ranking parking location is required;

wherein, based on the biasing, adjusting, with the control system, a target parking position for the vehicle in the highest ranking parking location;

wherein the processer, based on the one or more sensors, is further configured to determine if an adjacent vehicle is blocking the highest ranking parking location, based on the accessibility profile;

wherein the processer is further configured to generate a request to move the adjacent vehicle to a different location;

wherein a communication device, located within the vehicle, is configured to move the adjacent vehicle to the different location using (a) a vehicle-to-vehicle communication, (b) a fleet operator, (c) a manufacturer, or (d) a controlling entity;

wherein the processer is further configured to autonomously adjust the target parking position, based on using the one or more sensors;

wherein the control system is further configured, after routing the vehicle to the highest ranking parking location, if the highest ranking parking location is not available, to route the vehicle to a predefined location, drop one or more passengers off, and then the vehicle proceeds autonomously to a next available parking space; and wherein the vehicle profile comprises information about a required clearance distance for an extension ramp and/or a lift that extends outwards from a side or a rear position of the vehicle, if needed.

9. The system of claim 8, wherein the one or more sensors are selected from a sensing camera, a LIDAR sensor, a RADAR sensor, a global positioning sensor, an ultrawide band sensor, a vehicle-to-vehicle communication device, or a cellular communication device using a short range/near field protocol, or combinations thereof.

10. A method for vehicle accessibility parking comprising:

creating an accessibility profile associated with a vehicle;

developing, customizing, and managing the accessibility profile with a mobile application or a web-based application;

creating a vehicle profile associated with the vehicle;

identifying, based on the vehicle profile and the accessibility profile, one or more parking locations;

ranking, based on the vehicle profile and the accessibility profile, the one or more parking locations and selecting a highest ranking parking location;

routing the vehicle to the highest ranking parking location;

determining, by by one or more vehicle sensors, if a biasing of the vehicle in the highest ranking parking location is required;

adjusting, based on the biasing, using the one or more vehicle sensors, a target parking position for the vehicle in the highest ranking parking location;

determining if an adjacent vehicle is blocking the highest ranking parking location based on the accessibility profile;

generating, based on if the adjacent vehicle is blocking the highest ranking parking location, a request to move the adjacent vehicle to a different location;

autonomously adjusting, by the vehicle using the one or more vehicle sensors, based on the biasing, a target parking position for the vehicle in the highest ranking parking location; and after routing the vehicle to the highest ranking parking location, if the highest ranking parking location is not available, then dropping one or more passengers off at a predefined location via the vehicle, and then the vehicle proceeding autonomously to a next available parking space; and wherein the one or more vehicle sensors is selected from: a global positioning sensor, an ultrawide band sensor, a vehicle-to-vehicle communication device, and a cellular communication device using a short range/near field protocol, or combinations thereof.

11. The method of claim 10, further comprising storing the accessibility profile on a cloud resource, a remote server, and/or by communicating the accessibility profile from the vehicle to another vehicle.

12. The method of claim 10, further comprising when an upgraded parking location becomes available, that the vehicle then proceeds autonomously to the upgraded parking location.

13. The method of claim 12, wherein the upgraded parking location comprises a parking space that is closer to a point of interest and/or that is closer to a parking space that better matches the accessibility profile.

14. The method of claim 10, wherein the accessibility profile comprises information about locations of covered parking spaces and/or locations of electric vehicle (EV) charging stations.

15. The method of claim 10, further comprising displaying the accessibility profile on a heads-up display located inside of the vehicle and/or providing the accessibility profile to a vehicle occupant via real-time texting.

16. The method of claim 10, wherein the accessibility profile comprises information about a closest parking location with access to an elevator in a building and/or about vehicle access to a side door of the building.

17. The system of claim 8, further comprising a heads-up display in the vehicle.

18. The method of claim 1, wherein the accessibility profile comprises information about one or more locations of covered parking spaces and/or one or more locations of electric vehicle (EV) charging stations.

19. The method of claim 1, wherein the accessibility profile comprises information about a closest parking location with access to an elevator in a building and/or information about vehicle access to a side door of the building.

20. The method of claim 10, wherein the accessibility profile comprises information about: (a) a known parking location, (b) vehicle access equipment, and/or (c) a maximum distance to a point of interest; and wherein the vehicle profile is associated with at least two different accessibility profiles assigned to at least two occupants of the vehicle.

* * * * *